(12) United States Patent
Ju et al.

(10) Patent No.: US 10,000,402 B2
(45) Date of Patent: Jun. 19, 2018

(54) PRODUCING ALGAL BIOMASS AND PRODUCTS FROM ORGANIC SOLID MATERIAL

(71) Applicants: Lu-Kwang Ju, Akron, OH (US); Cong Li, Akron, OH (US); Suo Xiao, Akron, OH (US)

(72) Inventors: Lu-Kwang Ju, Akron, OH (US); Cong Li, Akron, OH (US); Suo Xiao, Akron, OH (US)

(73) Assignee: The University of Akron, Akron, OH (US)

( * ) Notice: Subject to any disclaimer, the term of this patent is extended or adjusted under 35 U.S.C. 154(b) by 8 days.

(21) Appl. No.: 14/893,160

(22) PCT Filed: May 30, 2014

(86) PCT No.: PCT/US2014/040180
§ 371 (c)(1),
(2) Date: Nov. 23, 2015

(87) PCT Pub. No.: WO2014/194174
PCT Pub. Date: Dec. 4, 2014

(65) Prior Publication Data
US 2016/0102007 A1  Apr. 14, 2016

Related U.S. Application Data

(60) Provisional application No. 61/829,311, filed on May 31, 2013.

(51) Int. Cl.
| C12N 1/12 | (2006.01) |
| C02F 11/02 | (2006.01) |
| C02F 3/32 | (2006.01) |
| C02F 3/00 | (2006.01) |
| A01G 33/00 | (2006.01) |
| C02F 1/36 | (2006.01) |
| C02F 3/28 | (2006.01) |

(52) U.S. Cl.
CPC .............. *C02F 11/02* (2013.01); *A01G 33/00* (2013.01); *C02F 3/006* (2013.01); *C02F 3/322* (2013.01); *C02F 1/36* (2013.01); *C02F 3/28* (2013.01); *C02F 2209/001* (2013.01); *C02F 2209/003* (2013.01); *C02F 2209/02* (2013.01); *C02F 2209/06* (2013.01); *C02F 2209/14* (2013.01); *C02F 2209/22* (2013.01); *C02F 2209/40* (2013.01); *C02F 2209/42* (2013.01); *C02F 2209/44* (2013.01); *C02F 2305/06* (2013.01); *Y02A 40/88* (2018.01)

(58) Field of Classification Search
None
See application file for complete search history.

(56) References Cited

U.S. PATENT DOCUMENTS

| 5,746,919 A | 5/1998 | Dague | |
| 7,993,522 B2 | 8/2011 | Curtis | |
| 2010/0279354 A1* | 11/2010 | de Crecy | ............. C12P 7/6463 435/71.1 |
| 2010/0297714 A1 | 11/2010 | Ju | |

FOREIGN PATENT DOCUMENTS

EP         0220647 A1    5/1987

* cited by examiner

*Primary Examiner* — Michelle F. Paguio Frising
(74) *Attorney, Agent, or Firm* — Renner Kenner Greive Bobak Taylor & Weber (57) ABSTRACT

A method for treating solid organic materials includes providing phagotrophic algae, providing solid organic material, combining the algae and the solid organic material, allowing the algae to grow by engulfing or uptaking the solid organic material, forming an algal product, and collecting the algal product. The method can also include a pretreatment step. The solid organic material can be waste activated sludge. A system for treating and disposing solid organic material is also provided.

16 Claims, 8 Drawing Sheets

PRODUCING ALGAL BIOMASS AND PRODUCTS FROM ORGANIC SOLID MATERIAL

CROSS-REFERENCE TO RELATED APPLICATION

This application claims priority to U.S. Provisional Patent Application No. 61/829,311 filed on May 31, 2013, the contents of which are incorporated herein by reference.

FIELD OF THE INVENTION

The present invention generally relates to the production of algal biomass and products from organic solid material. The present invention further relates to an improved method and system of treating and disposing organic solid waste.

BACKGROUND OF THE INVENTION

One of the major problems facing human society is the disposal of organic solid waste produced by human activities. This organic solid waste may contain harmful chemicals or pathogenic microorganisms. The release of organic solid waste into the environment without any treatment can cause serious environmental issues and even diseases to human beings.

Currently, landfill, incineration, and biological digestion (mostly under anaerobic conditions) are the common methods for organic solid waste disposal. The methods of landfilling and incinerating organic solid waste are cheap but cause environmental issues. For instance, the landfill of waste sewage can cause wind-blown litter, attraction of vermin, and generation of liquid leachate. The incineration of waste sewage causes emission of gaseous pollutants.

The method of using anaerobic digestion of organic solid waste can generate methane-containing biogas that may be used to produce electricity. However, this method requires a lengthy time requirement in the range of 20 to 30 days. Further, this method induces a high capital cost, which makes this method not economical. In some instances, the disposal of waste activated sludge represents 30-40% of the total capital cost and about 50% of the operating cost of many wastewater treatment facilities.

Thus, there is a need in the art for an improved method and system of treating organic solid waste. There is a further need for an improved method and system of producing algal biomass and products from organic solid materials.

SUMMARY OF THE INVENTION

In a first embodiment, the present invention provides a method for treating solid organic material comprising the steps of providing phagotrophic algae, providing solid organic material, combining the algae and the solid organic material, allowing the algae to grow by engulfing or uptaking the solid organic material, forming an algal product, and collecting the algal product.

In a second embodiment, the present invention provides a method as in the first embodiment, wherein the solid organic material is a food manufacturing or agricultural byproduct.

In a third embodiment, the present invention provides a method as in either the first or second embodiment, wherein the algae is selected from the group consisting of chrysomonad genera including *Dinobryon, Chrysochromulina, Chrysophaerella, Uroglena, Catenochrysis, Ochromonas, Chromulina,* and *Chrysococcus*; the prymnesiophyte *Chrysochromulina*; the coccolithophorid *Coccolithus pelagicus*; the xanthophyte *Chlorochromonas*, the chrysophytes *Phaeaster, Chrysamoeba,* and *Pedinella*; the photosynthetic dinoflagellate *Ceratium hirundinella* Muller; and *Cryptomonas ovata* Ehrenberg.

In a fourth embodiment, the present invention provides a method as in any of the first through third embodiments, wherein the solid organic material is waste activated sludge.

In a fifth embodiment, the present invention provides a method as in any of the first through fourth embodiments, further comprising the step of forming an algal byproduct, wherein the algal byproduct includes the treated waste activated sludge, wherein the step of allowing the algae to grow by engulfing or uptaking the waste activated sludge causes the pathogen level in the algal byproduct to be at a level below detectable limits, and wherein the algal byproduct meets one of the following requirements: the density of fecal coliform in the algal byproduct is less than 1,000 most probable numbers (MPN) per gram total solids on a dry-weight basis, or the density of *Salmonella* sp. bacteria in the algal byproduct is less than 3 MPN per 4 grams of total solids on a dry-weight basis.

In a sixth embodiment, the present invention provides a method as in any of the first through fifth embodiments, further comprising the step of pretreating the solid organic material before the step of combining the algae and the solid organic material.

In a seventh embodiment, the present invention provides a method as in any of the first through sixth embodiments, wherein the pretreating step is selected from the group consisting of disinfecting and sterilizing any organisms and spores that exist in the solid organic material, digesting at least a portion of the solid organic material by aerobic digestion, and digesting at least a portion of the solid organic material by anaerobic digestion.

In an eighth embodiment, the present invention provides a method as in any of the first through seventh embodiments, wherein the pretreating step includes treating the solid organic material with a base at a pH of greater than 9 for 6 hours or more.

In a ninth embodiment, the present invention provides a method as in any of the first through eighth embodiments, wherein the pretreating step includes subjecting the solid organic material to sound energy such that a sonication step is performed.

In a tenth embodiment, the present invention provides a method as in any of the first through ninth embodiments, further comprising the steps of combining the solid organic material with microorganisms, allowing the microorganisms to uptake nutrients from the solid organic material, depleting at least one soluble nutrient component essential for microbial growth, wherein said steps of combining, allowing, and depleting occur before the step of combining the algae and the solid organic material.

In an eleventh embodiment, the present invention provides a method as in any of the first through tenth embodiments, wherein the microorganisms are bacteria.

In a twelfth embodiment, the present invention provides a method as in any of the first through eleventh embodiments, further comprising the step of allowing phagotrophic algae to grow as the predominant algae, after said step of depleting at least one soluble nutrient component essential for microbial growth and before said step of combining the algae and the solid organic material.

In a thirteenth embodiment, the present invention provides a method for treating solid organic materials comprising the steps of providing waste activated sludge at a pH of above 7, pretreating the waste activated sludge, adjusting the pH of the waste activated sludge to a pH of below 7, providing phagotrophic algae, combining the algae with the waste activated sludge, forming an algal product, and collecting the algal product.

In a fourteenth embodiment, the present invention provides a method as in any of the first through thirteenth embodiments, wherein the step of pretreating includes maintaining the pH of the waste activated sludge above 7 for a time period of 20 minutes or more.

In a fifteenth embodiment, the present invention provides a method as in any of the first through fourteenth embodiments, wherein the step of pretreating includes subjecting the waste activated sludge to sound energy such that a sonication step is performed.

In a sixteenth embodiment, the present invention provides a method as in any of the first through fifteenth embodiments, further comprising an additional step selected from the group consisting of digesting at least a portion of the waste activated sludge by aerobic digestion, digesting at least a portion of the waste activated sludge by anaerobic digestion, and subjecting the waste activated sludge to sound energy such that a sonication step is performed, where the additional step occurs before said step of combining algae with the waste activated sludge.

In a seventeenth embodiment, the present invention provides a method as in any of the first through sixteenth embodiments, wherein further comprising an additional step selected from the group consisting of digesting at least a portion of the waste activated sludge by aerobic digestion and digesting at least a portion of the waste activated sludge by anaerobic digestion, where the additional step occurs before said step of combining algae with the waste activated sludge.

In an eighteenth embodiment, the present invention provides a system for treating and disposing solid organic material comprising phagotrophic algae, solid organic material, a first vessel, a second vessel, and a third vessel, wherein the first vessel is a pretreatment vessel for performing a pretreatment step on the solid organic material, wherein the second vessel contains the algae and allows the algae to grow by engulfing or uptaking the solid organic material, thereby allowing the algae to produce one or more algal products, wherein the third vessel is a vessel for separating and collecting the one or more algal products.

In a nineteenth embodiment, the present invention provides a system as in the eighteenth embodiment, wherein the system operates in a continuous mode.

In a twentieth embodiment, the present invention provides a system as in the eighteenth embodiment, wherein the system operates in a batch mode.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

The present invention relates to the production of algal biomass and products from organic solid material. The present invention further relates to an improved method and system of disposing organic solid waste. Algae are utilized to convert the organic solid material into algal biomass and particular algal products, such as lipids.

One or more embodiments of the present invention provide a system comprising algae and organic solid material. Such systems are particularly advantageous when phagotrophic algae, algae that feed by engulfing their food, are utilized. One or more embodiments of the present invention provide a method that includes a step of pretreating the organic solid material. A step of pretreatment can be selected according to the particular organic solid material that is utilized, as will be discussed in detail below. The present invention provides one or more of the following advantages over the known art: disposes organic solid waste, produces algal products, and destroys harmful pathogens.

It is envisioned that the algae used in the present invention need to be phagotrophic algae. The phagotrophic algae can also perform other functions and can therefore also have other classifications in addition to phagotrophic. Such classifications can include photosynthetic, heterotrophic, and osmotrophic. The algae may have more than one of these classifications.

Phagotrophic algae are those that grow by engulfing their food, photosynthetic algae are those that grow by using light as the energy source, heterotrophic algae are those that feed on organic substrates, and osmotrophic algae uptake dissolved compounds through a membrane via osmosis or other active transport mechanisms (excluding phagotrophy) across the membrane.

Phagotrophic algae are algae that feed by engulfing their food, similar to the function of a mouth. Because of this ability to swallow and degrade their food, phagotrophic algae are particularly useful in the present invention. A large fraction of solid organic materials have limited solubility in water because of their large molecular weights, because of the presence of hydrophobic domains or moieties, or due to physical or chemical crosslinks. This insolubility seriously hinders the degradation of these materials because water is often an important element for promoting faster degradation (e.g., by hydrolysis) and only the outer surface of insoluble materials is in contact with water. Being insoluble in water causes particular difficulties to biodegradation of these materials because the predominant majority of microorganisms can uptake only small soluble organics. For larger molecules, even if water soluble, the microorganisms need to produce and release specific enzymes into the surrounding water to break these larger molecules into smaller, ingestible molecules. Producing enzymes requires valuable resources of microorganisms. It is also difficult to ensure that there is no consumption, or minimal consumption, of the enzyme-generated smaller organics by other neighboring microorganisms. The situation is even worse for insoluble material because these degradation enzymes can lose their functions by being adsorbed onto the organic solid material. Phagotrophic algae can engulf these insoluble materials and digest them with special enzymes that they keep inside their bodies without sharing the food generated with others.

Suitable phagotrophic algae may be chosen from several chrysomonad genera including *Dinobryon, Chrysophaerella, Uroglena, Catenochrysis, Ochromonas, Chromulina,* and *Chrysococcus*; the prymnesiophyte *Chrysochromulina*; the coccolithophorid *Coccolithus pelagicus*; the xanthophyte *Chlorochromonas*, the chrysophytes *Phaeaster, Chrysamoeba,* and *Pedinella*; the dinoflagellate *Ceratium hirundinella* Muller; and *Cryptomonas ovata* Ehrenberg.

In one or more embodiments, the algae are selected from *Chlorella* and *Ochromonas* species. In one or more embodiments, the algae are *Ochromonas* species. In one or more embodiments, the algae are *Chlorella* species.

Other suitable phagotrophic may be chosen from *Dinobryon* chrysomonads, *Chrysophaerella* chrysomonads, *Uroglena* chrysomonads, *Catenochrysis* chrysomonads, *Ochromonas* chrysomonads, *Chromulina* chrysomonads, *Chrysococcus* chrysomonads, *Chrysochromulina* prymnesiophytes, *Coccolithus pelagicus* coccolithophorids, *Chlorochromonas* xanthophytes, *Phaeaster* chrysophytes, *Chrysamoeba* chrysophytes, *Pedinella* chrysophytes, *Ceratium* hirundinella, and *Cryptomonas* ovate.

Still other suitable phagotrophic may be chosen from *Ochromonas* species including *Ochromonas danica, Ochromonas malhamensis, Ochromonas tuberculata, Ochromonas vallescia,* and other *Ochromonas* chrysophytes.

As discussed above, the algae used in the present invention are phagotrophic, but can also be described by additional classifications. Photosynthetic are those algae that utilize light as their energy source through the process of photosynthesis. Heterotrophic algae are those that feed on organic substrates.

Osmotrophic algae uptake dissolved compounds through a membrane via osmosis or other active transport mechanisms (excluding phagotrophy) across the membrane. Suitable osmotrophic algae may be chosen from *Achnanthes orientalis, Agmenellum, Amphiprora hyaline, Amphora coffeiformis, Amphora coffeiformis linea, Amphora coffeiformis punctata, Amphora coffeiformis taylori, Amphora coffeiformis tenuis, Amphora delicatissima, Amphora delicatissima capitata, Amphora sp., Anabaena, Ankistrodesmus, Ankistrodesmus falcatus, Boekelovia hooglandii, Borodinella sp., Botryococcus braunii, Botryococcus sudeticus, Carteria, Chaetoceros gracilis, Chaetoceros muelleri, Chaetoceros muelleri subsalsum, Chaetoceros sp., Chlorella anitrata, Chlorella Antarctica, Chlorella aureoviridis, Chlorella candida, Chlorella capsulate, Chlorella desiccate, Chlorella ellipsoidea, Chlorella emersonii, Chlorella fusca, Chlorella fusca var. vacuolata, Chlorella glucotropha, Chlorella infusionum, Chlorella infusionum var. actophila, Chlorella infusionum var. auxenophila, Chlorella kessleri, Chlorella lobophora, Chlorella luteoviridis, Chlorella luteoviridis var. aureoviridis, Chlorella luteoviridis var. lutescens, Chlorella miniata, Chlorella minutissima, Chlorella mutabilis, Chlorella nocturna, Chlorella parva, Chlorella photophila, Chlorella pringsheimii, Chlorella Protothecoides, Chlorella protothecoides var. acidicola, Chlorella regularis, Chlorella regularis var. minima, Chlorella regularis var. umbricata, Chlorella reisiglii, Chlorella saccharophila, Chlorella saccharophila var. ellipsoidea, Chlorella salina, Chlorella simplex, Chlorella sorokiniana, Chlorella sp., Chlorella sphaerica, Chlorella stigmatophora, Chlorella vanniellii, Chlorella vulgaris, Chlorella vulgaris, Chlorella vulgaris f. tertia, Chlorella vulgaris var. autotrophica, Chlorella vulgaris var. viridis, Chlorella vulgaris var. vulgaris, Chlorella vulgaris var. vulgaris f. tertia, Chlorella vulgaris var. vulgaris f. viridis, Chlorella xanthella, Chlorella zofingiensis, Chlorella trebouxioides, Chlorella vulgaris, Chlorococcum infusionum, Chlorococcum sp., Chlorogonium, Chroomonas sp., Chrysosphaera sp., Cricosphaera sp., Cryptomonas sp., Cyclotella cryptica, Cyclotella meneghiniana, Cyclotella sp., Dunaliella sp., Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera sp., Ellipsoidon sp., Euglena, Franceia sp., Fragilaria crotonensis, Fragilaria sp., Gleocapsa sp., Gloeothamnion sp., Hymenomonas sp., Isochrysis aff. galbana, Isochrysis galbana, Lepocinclis, Micractinium, Micractinium, Monoraphidium minutum, Monoraphidium sp., Nannochloris sp., Nannochloropsis salina, Nannochloropsis sp., Navicula acceptata, Navicula biskanterae, Navicula pseudotenelloides, Navicula pelliculosa, Navicula saprophila, Navicula sp., Nephrochloris sp., Nephroselmis sp., Nitschia communis, Nitzschia alexandrina, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitschia quadrangular, Nitzschia sp., Ochromonas sp., Oocystis parva, Oocystis pusilla, Oocystis sp., Oscillatoria limnetica, Oscillatoria sp., Oscillatoria subbrevis, Pascheria acidophila, Pavlova sp., Phagus, Phormidium, Platymonas sp., Pleurochrysis carterae, Pleurochrysis dentate, Pleurochrysis sp., Prototheca wickerhamii, Prototheca stagnora, Prototheca portoricensis, Prototheca moriformis, Prototheca zopfii, Pyramimonas sp., Pyrobotrys, Sarcinoid chrysophyte, Scenedesmus armatus, Spirogyra, Spirulina platensis, Stichococcus sp., Synechococcus sp., Tetraedron, Tetraselmis sp., Tetraselmis suecica, Thalassiosira weissflogii,* and *Viridiella fridericiana.*

The present invention is directed to the disposal of organic solid materials. Organic solid material generally refers to carbon-based materials. Examples of organic solid material include forest slash, food, yard debris, manures, and other agricultural residues. Although it is envisioned that any organic solid material can be utilized in the present invention, it is particularly envisioned that the present invention is useful for disposing those organic solid materials that are classified as wastes or byproducts.

In general, organic solid materials are more difficult to treat based on their properties. One such property is the particle size of these materials. The particle size must be such that the phagotrophic algae can ingest the materials. In one or more embodiments, organic solid materials can have particle sizes in the range of 100 microns or smaller. In other embodiments, the organic solid materials have a particle size of 10 microns or smaller. For organic solid materials having particle sizes that are higher than 100 microns, a pretreatment step is generally required. As discussed above, some organic solid materials have limited solubility in water, which hinders the degradation of these materials, which can necessitate the use of a pretreatment step.

Organic solid material particles tend to floc or agglomerate together to form agglomerations having sizes that are higher than 100 microns. For these larger sized agglomerations or particle combinations, algae can dissociate the materials locally and thereafter consume the smaller, dissociated particles. For instance, some flocs of waste activated sludge are loosely associated, such that the size of these overall flocs is relatively large. The algae can dissociate these larger flocs into smaller particles. Sizes up to 1 cm can be dissociated locally by the algae and the algae can then consume the subsequent materials. But the particles or tightly bound or crosslinked components of the materials should be smaller than 100 microns as this is the size limit for effective ingestion by phagotrophic algae.

Organic solid materials include organic solid waste. Organic solid waste can be generally defined as organic solid material that is unwanted or that serves no productive purpose. Some wastes have a deleterious effect on the environment. Some wastes result as zero value or low value byproducts of certain manufacturing or agricultural processes. Examples of zero value or low value byproducts include crop byproducts such as soybean hulls, rice hulls, wheat hulls, peanut shells, and pea shells. Other zero value or low value byproducts include the solid residues of fruits, vegetables, or seeds remaining from the manufacturing of juice, jam, oil, or similar products; the waste lignocellulosic biomass from municipal waste, industrial waste, pulp and paper industry waste, agricultural, gardening, or forestry plants; and food items such as bread, candy, or cheese that are removed from stores and factories after passing the shelf life. In the relevant technical field of this invention, such "waste" is generally known.

Particular organic solid materials can be characterized as waste activated sludge. Waste activated sludge is a particular term of art relative to the activated sludge process of treating sewage and industrial wastewaters. It can be generally defined as the waste that is removed from the activated sludge treatment process in order to keep the treatment process at particular conditions. Waste activated sludge includes both excess solids and excess organisms.

In some embodiments, waste activated sludge (or other organic solid materials) is combined with an amount of water in order to dilute the concentration of the waste activated sludge (or other organic solid materials). The amount of dilution, where water is utilized, may depend on the particular algae and waste activated sludge (or other organic solid materials) that are used. However, dilution generally causes the need for larger reactor sizes and for more final separation of the water from the treated waste solids. Thus, higher capital and operating costs are incurred where dilution is utilized. In general, dilution is utilized when the viscosity is too high for the waste sludge (or other organic solid materials) to be processed.

As a byproduct of wastewater treatment plants and processes, waste activated sludge is a readily available source of organic solid waste. Waste activated sludge generally exists as a flocculation having large floc structures and microorganisms embedded in polymer matrices. The matrices are formed by the biopolymers (proteins and polysaccharides) that are naturally produced by the present microorganisms and by some synthetic flocculent polymers, where present, that may be added by the wastewater treatment plants. These synthetic flocculent polymers improve sludge settling within clarifiers and allow the sludge to thicken more easily. Waste activated sludge is a form of solid organic waste that is more difficult to treat as compared to other organic solid wastes, such as food waste. Since the present invention is able to treat and dispose of waste activated sludge, this indicates the applicability of the technology for many other forms of solid organic materials.

Treated waste activated sludge can be used as a soil conditioner or as a partial fertilizer. The sludge has beneficial plant nutrients and soil conditioning properties, but it may also contain pathogenic bacteria, viruses, protozoa, parasites, and other disease-causing microorganisms. In this respect, waste activated sludge can be further characterized with respect to Class A and Class B pathogen requirements as defined by the US Environmental Protection Agency.

Once waste activated sludge has been treated, it is then classified as biosolids. These biosolids must meet certain requirements before they can be further used, where the requirements are set forth within the Class A and Class B requirements. These Class A and Class B requirements generally deal with reducing the amount of pathogens that exist in the biosolids as pathogens are organisms or substances that are capable of causing disease. Pathogens are generally present in waste activated sludge and can affect humans through ingestion, inhalation, and dermal contact. Treating the sludge to meet the Class A and Class B requirements prevent disease transmission. As the present invention destroys pathogens that may be present in the organic solid materials, the remaining biosolids are capable of meeting the Class A and Class B requirements.

To meet Class A requirements, the EPA sets forth that the biosolids must first meet one of the following six requirements: treated thermally, treated in a high pH-high temperature process, treated in other processes, treated in unknown processes, treated in a process to further reduce pathogens (PFRP), or treated in a process equivalent to a PFRP. The biosolids must also meet one of the two following requirements: the density of fecal coliform in the biosolids must be less than 1,000 most probable numbers (MPN) per gram total solids (dry-weight basis) or the density of *Salmonella* sp. bacteria in the biosolids must be less than 3 MPN per 4 grams of total solids (dry-weight basis). These alternatives each include certain requirements that must be met, which are further set forth in the EPA's publication, "Control of Pathogens and Vector Attraction in Sewage Sludge" (EPA/625/R-92/013; Revised July 2003), which is incorporated herein by reference. In general, treating sludge to meet the Class A requirements causes the pathogens to be at levels below detectable limits. It is set forth that the present invention of using algae to treat and discard organic solid materials will result in biosolids that are able to meet the Class A requirements.

The Class B requirements allow for detectable amounts of pathogens to remain in the biosolids. The EPA sets forth that one of the following three alternatives must be met for Class B biosolids: monitoring of indicator organisms, biosolids treated in a process to significantly reduce pathogens (PSRP), or biosolids treated in a process equivalent to a PSRP. These alternatives are further discussed in the EPA's publication, "Control of Pathogens and Vector Attraction in Sewage Sludge." It is set forth that the present invention of using algae to treat and discard organic solid materials will result in biosolids that are able to meet the Class B requirements.

In one or more embodiments, an organic solid material is subjected to a pretreatment before being combined with the algae. The specific pretreatment that may be utilized varies based on the particular organic solid material and algae that are used. The selection of a pretreatment can be to achieve particular purposes such as breaking down and releasing the solid organic materials into smaller particles or the hydrolysis of oligomeric and polymeric compounds in the solid material into smaller compounds. This action of creating smaller substances is done for faster disintegration in aqueous solutions and for improving the direct ingestion properties.

Other purposes for optional pretreatment include triggering biological mechanisms for the algae to dissociate the flocs (although these exact mechanisms are seemingly unknown); damaging, rupturing, or hydrolyzing the microbial biomass so that readily digestible nutrients are released; and minimizing premature microbial metabolism that consumes the nutrients that are present. These goals of pretreatment are particularly desired for treating waste activated sludge.

In the later-described direct process, a pretreatment method can be utilized to sterilize the yeast and fungi and their spores in the sludge. Where phagotrophic algae are utilized, the microalgae can ingest small bacteria easily but can be less effective in ingesting the larger yeast and fungi, particularly depending on the size of the phagotrophic microalgae used. Disinfection or sterilization of organisms and spores, so that the treated material disintegrates faster in aqueous solutions, allows for improved direct ingestion (phagocytizing), absorption, uptake, and/or transport across the algae cell wall and algae membrane.

In addition to disinfection and sterilization, a particularly useful pretreatment is treating the organic solid materials with a base. Another particularly useful pretreatment is the addition of a carbon source. Other useful pretreatment methods include physical methods such as mixing, crushing, milling, heating, steaming, ultra-sonication, and homogenizing, and chemical methods such as treatment with an acid, acidification, basification, ozonization, and bleaching. Another useful pretreatment method is biological pretreatment, such as subjecting the organic solid materials to anaerobic digestion or aerobic digestion or both anaerobic and aerobic digestion. It is envisioned that combinations of these pretreatments can be used, particularly depending on the properties of a specific solid organic material. These combinations can be arranged in certain sequential arrangement in an effort to achieve the best technical and/or economical pretreatment outcomes.

In one or more embodiments, combinations of these pretreatment methods can result in synergistic effects. For instance, in a particular embodiment, using both sonication and alkaline treatment as pretreatment methods results in the synergistic effect of significantly reducing the required pretreatment time. This reduction in pretreatment time results from enhanced sludge disintegration. In one or more embodiments, the sonication and alkaline pretreatment is to first adjust the solid organic materials to a pH of from 8 or more to 13 or less and to then sonicate the materials. In one or more embodiments, the pH is adjusted to from 9 or more to 11 or less prior to the sonication.

In one or more embodiments, the frequency used for sonication pretreatment is in the range of from 20 kHz or more to 4000 kHz or less. In one or more embodiments, the frequency used for sonication pretreatment is in the range of 20 kHz or more to 100 kHz or less. In one or more embodiments, the energy density applied in sonication pretreatment is in the range of from 0.1 W/mL or more to 30 W/mL or less. In one or more embodiments, the energy density applied in sonication pretreatment is in the range of from 0.3 W/mL or more to 3 W/mL or less. In one or more embodiments, the sonication pretreatment time is in the range of from 1 minute or more to 600 minutes or less. In one or more embodiments, the sonication pretreatment time is in the range of from 10 minutes or more to 30 minutes or less. These variables can be selected based on the solid organic materials and particular process that are utilized.

In one or more embodiments, pretreatment with a base includes treating the solid organic materials with sodium hydroxide (NaOH). In one or more embodiments, a base used for pretreatment has a pH of 12 or more. In one or more embodiments, a base used for pretreatment has a pH of from 9 or more to 14 or less. In one or more embodiments, a base used for pretreatment has a mass concentration of 8 g/L or approximate thereto, in other embodiments from 6 g/L or more to 10 g/L or less, and in other embodiments from 3 g/L or more to 12 g/L or less. In one or more embodiments, the solid organic materials are treated with a base for 48 hours or approximate thereto, in other embodiments for from 24 hours or more to 48 hours or less, in other embodiments for less than 240 hours, and in other embodiments for less than 24 hours. These variables can be selected based on the solid organic materials and particular process that are utilized.

In one or more embodiments, pretreatment with an acid includes treating the solid organic materials with sulfuric acid. In one or more embodiments, an acid used for pretreatment has a pH of from 1 or more to 4 or less. In one or more embodiments, an acid used for pretreatment has a mass concentration of from 0.2 g/L or more to 10 g/L or less. In one or more embodiments, the solid organic materials are treated with an acid for from 1 hour or more to 100 hours or less. These variables can be selected based on the solid organic materials and particular process that are utilized.

In one or more embodiments, pretreatment that includes the addition of a carbon source uses a carbon source selected from the group consisting of ketchup, glucose, waste cooking oil, waste grease, acetic acid, citric acid, oleic acid, and ethanol. The addition of a carbon source can result in an increase in algae number concentration and an increase in the percentage of organic reduction percentage. The organic reduction results are determined by measuring the organics in the output stream compared to the organics in the input stream, with the reduction being the difference in these organics values, or the amount of organics that have been treated by the algae. In one or more embodiments, the additional carbon source is added, with respect to the weight of organic solid material, at 1 wt % or more to 100 wt % or less, in other embodiments from 10 wt % or more to 70 wt % or less, and in other embodiments from 20 wt % or more to 50 wt % or less.

In one or more embodiments, pretreatment with anaerobic digestion includes treating the solid organic materials for a certain period of time in a closed reactor or a semi-closed reactor to prevent unsafe pressurization due to accumulation of gaseous products. Anaerobic digestion of solid organic materials can help dissociate the solid organic materials into smaller and/or looser structures. Anaerobic digestion of solid organic materials can convert part of the solid organic materials into soluble organic materials. The presence of smaller and/or looser solids and more soluble organic materials is helpful to algal growth and organic reduction activities. In one or more embodiments, solid organic materials are treated with anaerobic digestion for 6 hours or more to 240 hours or less. In one or more embodiments, solid organic materials are treated with anaerobic digestion for 24 hours or more to 120 hours or less. These variables can be selected based on the solid organic materials and particular process that are utilized.

In one or more embodiments, pretreatment with aerobic digestion includes treating the solid organic materials in an aerated reactor for a certain time period. Aerobic digestion of solid organic materials can help dissociate the solid organic materials into smaller and/or looser structures. Aerobic digestion of solid organic materials can convert part of the solid organic materials into soluble organic materials. Presence of smaller and/or looser solids and more soluble organic materials is helpful to algal growth and organic reduction activities. In one or more embodiments, solid organic materials are treated with aerobic digestion for 6 hours or more to 240 hours or less. In one or more embodiments, solid organic materials are treated with anaerobic digestion for 12 hours or more to 120 hours or less. These variables can be selected based on the solid organic materials and particular process that are utilized.

One or more embodiments of the present invention provide a method of providing an algae, treating a solid organic material, growing algae, and producing an algal product. If a pretreatment is used for the solid organic materials, the solid organic materials are combined with the algae after the one or more pretreatments are carried out. The solid organic materials are combined with the algae in order for the algae to grow and produce an algal product. The algae growth can be achieved by either an indirect process or a direct process.

In an indirect process, the pretreated or untreated solid organic materials are added to a vessel having smaller fast-growing microorganisms therein, such as bacteria. These microorganisms can then grow by eating the soluble or released nutrients from the solid organic materials. The microorganism growth depletes at least one soluble nutrient component that would be essential for microbial growth from the solid organic materials. Thus, after transferring the contents of this microorganism vessel to an algae vessel, this depletion of this soluble nutrient causes phagotrophic algae to grow as the predominant population. This is because the phagotrophic algae can obtain all the necessary nutrients by ingestion, such as ingesting bacteria and other small particles, while the growth of other heterotrophic microorganisms would be severely impeded due to the depletion of at least one soluble nutrient essential to their growth.

An indirect method is also beneficial when the solid organic materials include vegetative microorganisms and their spores. Subjecting these solid organic materials to the bacteria allows the bacteria to outcompete treat the vegetative microorganisms and spores. In this regard, the indirect process can require less stringent pretreatment of the solid organic materials, such as not requiring sterilization pretreatment, because the outcome results in generally smaller bacteria that are easier to ingest by the phagotrophic algae. It is envisioned that a continuous culture process can be utilized in some embodiments, which sets the dilution rate of this bacteria stage to allow only small bacteria to grow inside and washes out the slower growing larger microorganisms.

In a direct process, the solid organic materials are fed to the algae without going through an intermediate microorganism vessel. The direct process has the potential advantage of preserving all the nutrients in the solid organic materials for algal growth and lipid production, without the mineralization that otherwise occurs in an intermediate microorganism vessel.

However, for using the direct process, any pretreatment methods used should preferably destroy all the vegetative microorganisms and spores that exist in the solid organic materials. The algal process can handle the presence of bacterial spores but only limited numbers of fungal spores. With proper algal cells inoculated into the process, these algal cells can consume the predominant majority of organics available before the fungal spores germinate and the cells grow to high concentrations. The small bacterial cells germinated can be ingested as food by the phagotrophic algae. But presence of large numbers of yeast or fungal spores should be avoided. Phagotrophic algae cannot ingest the large yeast or fungi cells. Once germinated, they can compete with algae for the organic nutrients, leading to lower yield and quality of the algal biomass and products.

Both the direct process and the indirect process can be operated either in a continuous-flow mode or a batch/fed-batch mode. In a continuous-flow, indirect mode, the solid organic material is continuously pumped into an intermediate microorganism vessel, the contents of the intermediate microorganism vessel are continuously pumped or overflowed into an algae vessel, and the contents of the algae vessel are continuously pumped or overflowed into a next vessel for separation and collection of the produced algae. The continuous-flow, direct mode would be similar except that it would not include the intermediate microorganism vessel. In one or more embodiments, the flows from vessel to vessel in the continuous process have the same time-averaged rates such that the volumes in the vessels remain constant and the process can be operated at semi-steady state.

In a batch/fed-batch, indirect mode, the solid organic materials are added in a batched single step to an intermediate microorganism vessel having a volume of seed microorganisms. The intermediate microorganism vessel mixture is held for a proper duration of time to allow the microorganisms to grow and deplete the at least one essential nutrient. A majority, or all, of the contents of this intermediate microorganism vessel is then transferred as a batch to an algae vessel that contains a volume of seed algal culture. The algae vessel is then held for a proper duration of time to allow the algae to grow and produce an algal product. A majority, or all, of the contents of this algae vessel is then transferred as a batch to a third vessel for algae separation and collection.

The continuous-flow, direct mode would be similar except that it would not include the intermediate microorganism vessel. Other possible arrangements of these continuous-flow and batch/fed-batch processes may be known to those skilled in the art.

A wide range of useful algae products can be developed from algae and the algal components and byproducts. Examples of algal products include algal biomass, dry algal cells, algal proteins, algal lipids, and algal carbohydrates. Algal biomass and algal lipid can be further converted into biofuel. Other examples of algal products include specialty substances with nutritional, pharmaceutical, cosmetic, and industrial uses.

Biomass can be generally described as biological material derived from living, or recently living organisms. With respect to algal biomass, it can be described as the wet algal cell mass separated from the aqueous medium in which the algal cells are cultivated or as the totally or partially dried algal cell mass. Biomass can be used as an energy source directly via combustion or co-combustion with other fuel to produce heat, or indirectly after converting the biomass to biofuel.

Biofuel can be generally described as fuel that contains energy from geologically recent carbon fixation. Here, biofuel is fuel that is produced from the algae and algae products. Biomass can be converted to biofuel and other energy containing substances in three different ways: thermal conversion, chemical conversion, and biochemical conversion.

Lipids may be broadly defined as hydrophobic or amphiphilic small molecules. The main biological functions of lipids include storing energy, signaling, and acting as structural components of cell membranes. Lipids can be particularly converted to biofuel by extracting the lipids and reacting them with alcohols, such as methanol or ethanol, through well-known chemical or enzymatic processes to make biodiesel, i.e., methyl or ethyl esters of fatty acids.

The present invention provides one or more of the following advantages: treating solid organic materials, disposing of solid organic materials, destroying pathogens, and producing valuable products. The value of these products can offset the cost of solid organic waste disposal. Further, compared to the anaerobic digestion process (which requires 20-30 days) the present invention requires much less time (about 5 days). The shorter time translates to smaller required reactor volume and subsequently lower capital cost.

A particular estimate of advantages of the present invention shows that per kilogram of volatile solids in a waste activated sludge, about 0.13 kilogram of biodiesel can be produced through an indirect process and about 0.20 kg of biodiesel can be produced through a direct process. Setting an estimated price of biodiesel at $1.22/kg, the value generated by the new process from 1 kg volatile solids in the waste activated sludge is estimated at $0.16 and $0.24 per kg volatile solids, respectively. For comparison, the value of electricity generated from burning the biogas produced by an anaerobic digestion process was estimated at only about $0.04 per kg volatile solids. Thus, the present invention can be seen as generating higher (4 to 6 times) product values than the alternative anaerobic digestion process.

The conditions, such as time, pH, temperature, and dissolved oxygen, of the algae and the combined mixture of the algae and the solid organic materials can be adjusted to any conditions that will physiologically support the algae.

The algae and the solid organic materials are combined for a period of time that can be selected based on the particular algae and solid organic material that are utilized. In one or more embodiments, this timeframe is from 12 hours or more to 10 days or less. In one or more embodiments, this timeframe is from 1 day or more to 5 days or less.

The pH of the algae and combined mixture should be maintained within the physiologically acceptable range for the algae. The pH can also affect the transport/uptake of solid organic materials by algae. The pH can be controlled by any means known in the art. In one or more embodiments, the pH is from 2.5 or more to 8.5 or less. In one or more embodiments, the pH is from 4.0 or more to 6.0 or less.

The temperature of the algae and combined mixture should be maintained within the physiologically acceptable range for the algae. The temperature can be controlled by any heating or cooling equipment as known in the art. Such equipment may employ temperature sensors, thermometers, thermocouples and the like to monitor temperature, further including heating and/or cooling elements to control the temperature of the medium as monitored by those elements. Cooling is normally achieved by running cold water or other fluids through tubes or plates that are in contact with the algae and combined mixture. Heating is often achieved either by running hot water or other fluids through tubes or plates that are in contact with the algae and combined mixture, or by using electrically heated tubes, plates or other surfaces.

In one or more embodiments, the algae and combined mixture are maintained at from 10° C. or more to 40° C. or less, in other embodiments, from 15° C. or more to 35° C. or less, and in still other embodiments, from 20° C. or more to 30° C. or less. In one or more embodiments, the algae and combined mixture are at a temperature of 20° C. or more. In one or more embodiments, the algae and combined mixture are at a temperature of 28° C. or less. It should be noted that different algae have different physiologically suitable and tolerable temperatures. The optimal temperatures may be adjusted if more thermophilic or more psychrophilic algae are used.

The dissolved oxygen content of the algae and combined mixture should be maintained within the physiologically acceptable range for the algae. The dissolved oxygen content can be controlled by any means known in the art. In one or more embodiments, the dissolved oxygen content of the algae and combined mixture is controlled by adjusting the aeration flow rate and/or oxygen partial pressure of the gas (air, pure oxygen or mixtures of air and oxygen) and/or by adjusting the speed of mechanical agitation. The aeration rate and agitation speed are maintained within the range that provides adequate mixing without damaging or killing the algae cells (due to high shear stress or other damaging mechanisms).

In one or more embodiments, the algae and combined mixture have a dissolved oxygen content of from 0.02 milligram per liter (mg/L) or more to 10 mg/L or less, in other embodiments, from 0.05 mg/L or more to 5 mg/L or less, and in still other embodiments, from 0.1 mg/L or more to 2 mg/L or less. In one or more embodiments, the algae and combined mixture have a dissolved oxygen content of 0.2 mg/L or more. In one or more embodiments, the algae and combined mixture have a dissolved oxygen content of 1.5 mg/L or less.

In a particular embodiment, waste activated sludge is pretreated with a base before being combined with phagotrophic algae to dispose of the sludge. In another particular embodiment, the algae is of the *Dinobryon* and *Ochromonas* species and the waste activated sludge is pretreated with 8 g/L NaOH at a pH of greater than 12 for 6 hours or more. In another particular embodiment, the algae is of the *Dinobryon* and *Ochromonas* species and the waste activated sludge is pretreated at a pH of greater than 11 for 6 hours or more. In another particular embodiment, the algae is of the *Dinobryon* and *Ochromonas* species and the waste activated sludge is pretreated at a pH of greater than 10 for 6 hours or more. In another particular embodiment, the algae is of the *Dinobryon* and *Ochromonas* species and the waste activated sludge is pretreated at a pH of greater than 9 for 6 hours or more.

EXAMPLES

Example 1

As one example for demonstrating the present invention, the waste activated sludge generated by a wastewater treatment plant in Akron, Ohio was used as the solid organic material to be converted to algal products. The waste activated sludge was first pretreated with 8 g/L NaOH at a pH of greater than 12 for 48 hours.

After the pretreatment with NaOH, the size of flocs in the waste activated sludge was reduced significantly. The base pretreatment also caused significant increases in the concentrations of soluble nutrients, as seen in Table 1.

TABLE 1

Effect of pretreatment on the concentrations of soluble nutrients

|  | Soluble protein concentration (g/L) | Soluble sugar concentration (g/L) | $NH_3$—N concentration (g/L) |
|---|---|---|---|
| Original waste activated sludge | 0.16 | 0.01 | 0.006 |
| Waste sludge after base treatment | 7.71 | 1.38 | 0.05 |

To obtain the results in Table 1, soluble protein concentration was measured by the Bradford method, using bovine gamma globulin as the standard protein for calibration, soluble sugar concentration was measured by the dinitrosalicylic acid (DNS) analysis, using glucose as the standard for calibration, and $NH_3$—N concentration was measured using commercial $NH_3$—N test strips (Hach Company).

Example 2

In one example, using the indirect, continuous-flow process fed with a pretreated waste activated sludge that contained 30.87 g/L volatile solids (predominantly organic materials) prior to pretreatment. The waste activated sludge was first pretreated at a pH of greater than 12 for 48 hours. After pretreatment, a calculated volume of the slurry of waste activated sludge was pumped every 15 minutes into the vessel having small, fast-growing microorganisms. True continuous-flow process could not be operated in the small laboratory-scale system because solids would settle in the pump tubing under the slow continuous flow rate. Nonetheless, the frequent batch addition every 15 minutes simulated the continuous-flow process well. The addition rate was controlled to give an average retention time of 5 hours in this vessel having small fast-growing microorganisms. The content of this vessel was again pumped in frequent batches, every 15 minutes, into the next vessel having algae, to simulate the continuous-flow process. The total holding volume of the vessel having algae was controlled at 10 times larger than that of the vessel having small microorganisms so that the average retention time of the vessel having algae was maintained at 50 hours. To maintain constant average holding volume, a calculated volume of the content in the vessel having algae was pumped out every 15 minutes. The dissolved oxygen content of the vessel having smaller fast-growing microorganisms was maintained at 0.02 mg/L or higher by mixing and pumping air or oxygen into the vessel. The dissolved oxygen content of the vessel having algae was maintained at 0.02 mg/L or higher by mixing and pumping air or oxygen into the vessel. The pH of the vessel having smaller fast-growing microorganisms was controlled in the range from 6 to 7.5 by adding 0.2 M sodium hydroxide or 0.2 M hydrochloric acid. The pH of the vessel having algae was controlled in the range from 3 to 7 by adding 0.05 M sodium hydroxide or 0.05 M hydrochloric acid. When this overall process reached pseudo-steady state, algae dominated in the vessel having algae without significant amounts of yeast, fungus or other non-bacterial microorganisms that algae could not consume. About 18.43 g/L biomass were produced in an algae vessel and the lipid concentration was enhanced to 8.01 g/L, from 2.47 g/L in the original waste activated sludge. Through the indirect continuous-flow process, about 42% of the organics in the waste activated sludge was reduced.

Example 3

In one example, using the direct, batch process fed with a pretreated waste activated sludge that contained 30.87 g/L volatile solids (predominantly organic materials) prior to pretreatment. The waste activated sludge was first pretreated at a pH of greater than 12 for 48 hours. After pretreatment, 250 mL of the treated waste activated sludge was added into a 500 mL reactor. The reactor pH was adjusted to 4 and then a small amount of alga seeds was added to the reactor, to make the initial algal concentration at about 2% of the desired final algal concentration. The alga was allowed to grow by consuming the waste activated sludge while pH of the culture mixture was maintained in the range of from 3.5 to 4.5 by adding 0.05 M sodium hydroxide or 0.05 M hydrochloric acid. The dissolved oxygen content of the mixture was controlled at 0.02 mg/L or higher by mixing and pumping air into the reactor. Samples were taken periodically from the reactor. At 96 hours after alga inoculation, the algal number concentration stopped increasing. Analysis of the mixture at 96 hours gave the following results: About 25.09 g/L biomass were produced in the batch reactor and the lipid concentration was enhanced to 12.08 g/L, from 2.47 g/L in the original waste activated sludge. Through this direct, batch process, about 46% of the organics in the waste activated sludge was reduced.

Example 4

In one example, fresh waste activated sludge was first diluted with tap water until the solid concentration was 7.6 g/L. In 300 mL sludge, the pH was adjusted to 10 by NaOH and then the sludge was sonicated for 10 min by a MISONIX® sonicator. After this alkaline-sonication pretreatment, the organics in supernatant increased to 2 g/L. The sonicated sludge was centrifuged at 500 g for 10 min and the supernatant was acidified to a pH of 4 and fed to algae. After treatment with algae for 2 days, the lipid concentration increased from 0.07 g/L to 0.17 g/L and total organic mass reduction in this sludge-algae system was 42%.

Example 5

In one example, the effect of supplying extra carbon sources was investigated. Four systems were prepared, each using a starting point of waste activated sludge at a pH of 11.8, and stirring the sludge for 18 hours at that pH.

In System A, the treated waste sludge was diluted by 30 times with deionized water. After the pH adjusted to 5, the system was inoculated with 0.5 g/L algae. Then, the system was stirred with the pH controlled in the range from 3.5 to 6.5.

In System B, the treated waste sludge was diluted by 30 times with deionized water. Then 0.5 g/L of ketchup was added to the treated waste sludge. After the pH was adjusted to 5, the system was inoculated with 0.5 g/L algae. Then the system was stirred with the pH controlled in the range from 3.5 to 6.5.

In System C, the treated waste sludge was diluted by 30 times with deionized water. Then 0.5 g/L of glucose was added to the treated waste sludge. After the pH was adjusted to 5, the system was inoculated with 0.5 g/L algae. Then, the system was stirred with the pH controlled in the range from 3.5 to 6.5.

In System D, the treated waste sludge was diluted by 30 times with deionized water. Then 0.5 g/L of waste cooking oil was added to the treated waste sludge. After the pH was adjusted to 5, the system was inoculated with 0.5 g/L algae. Then, the system was stirred with the pH controlled in the range from 3.5 to 6.5.

Figure 1:
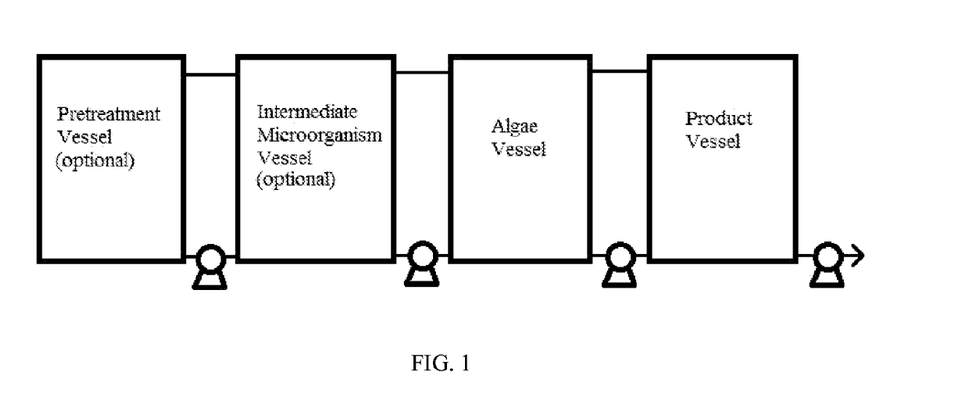
FIG. 1 is a schematic of an embodiment of the present invention.
Figure 2:
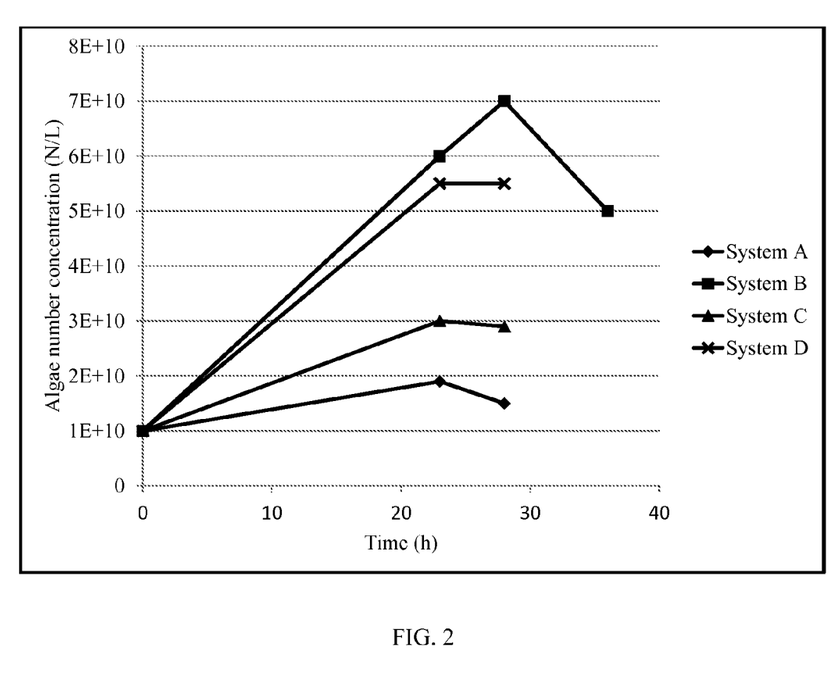
FIG. 2 is a graph showing algae number concentration change with time for Example 5 herein.
Figure 3:
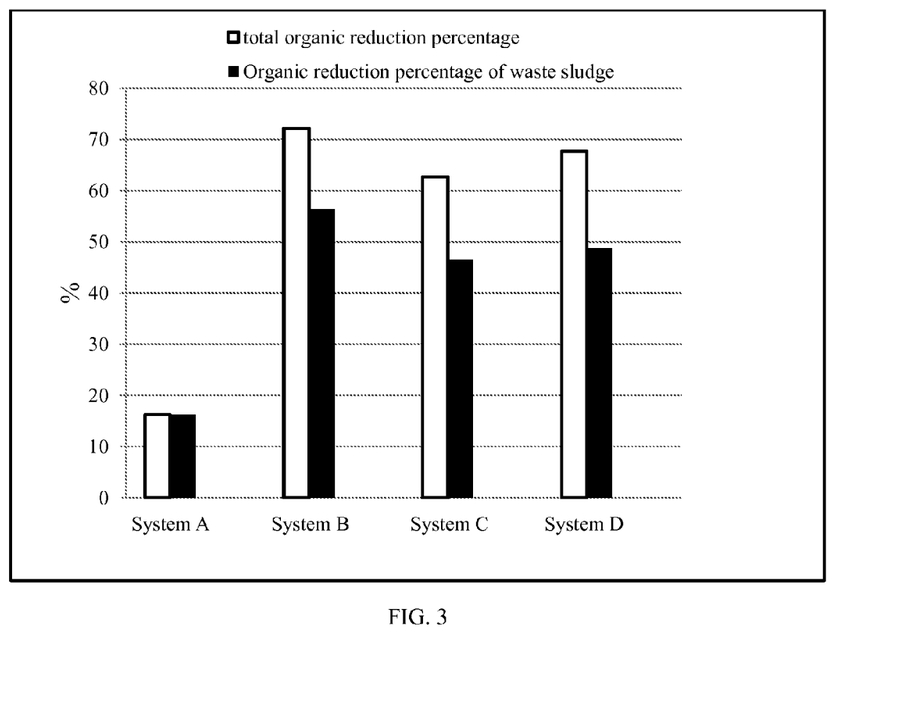
FIG. 3 is a graph showing reduction percentage of total organics and waste sludge organics for Example 5 herein.

FIG. 2 shows the change of algae number concentration with time for these systems. Additionally, the total organic concentration and the organic concentration of waste sludge were measured separately at 0 hours and at the time with the highest algal number concentration. The total organic reduction percentage and the organic reduction percentage of waste sludge are shown in FIG. 3. Compared to the system without adding any carbon sources (system A), the results for the systems with an additional carbon source (system B, system C and system D) demonstrate that the addition of a carbon source can enhance the organic reduction percentage of waste sludge.

Example 6

In one example, the effect of utilizing biological pretreatment, such as anaerobic digestion, was investigated. In System A, waste sludge was stirred for 6 hours. After stirring, the waste sludge was diluted by 30 times with deionized water. After the pH was adjusted to 5, the system was inoculated with 0.5 g/L algae. Then, the system was stirred with the pH controlled in the range from 3.5 to 6.5.

In System B, light anaerobic digestion of waste sludge was performed by keeping the waste sludge in a still closed system for 72 hours. Then, the waste sludge was stirred for 6 hours. After stirring, the waste sludge was diluted by 30 times with deionized water. After the pH was adjusted to 5, the system was inoculated with 0.5 g/L algae. Then, the system was stirred with the pH controlled in the range from 3.5 to 6.5.

Figure 4:
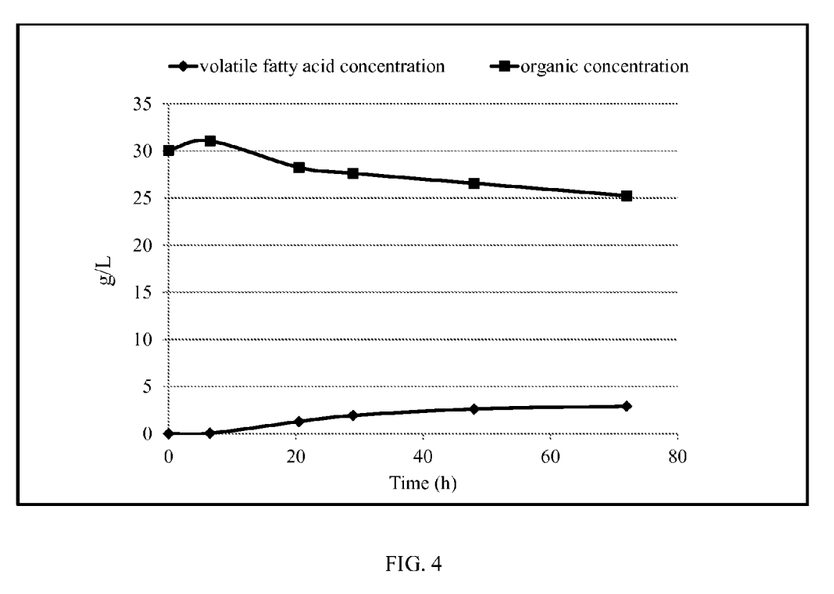
FIG. 4 is a graph showing concentration changes of volatile fatty acid and organics during the anaerobic digestion process for Example 6 herein.

FIG. 4 shows the change of organic concentration and volatile fatty acid concentration with time during the anaerobic digestion process. With the occurrence of anaerobic digestion, part of the waste sludge organics was converted into volatile fatty acid and biogas (methane, carbon dioxide, etc.). As a result, the organic concentration of the waste sludge kept decreased. After 72 hours, about 2.91 g/L of volatile fatty acid were produced from 30.28 g/L of waste sludge. Waste sludge lost about 19% of its organics (from 30.2 g/L to 24.5 g/L) in 72 hours.

Figure 5:
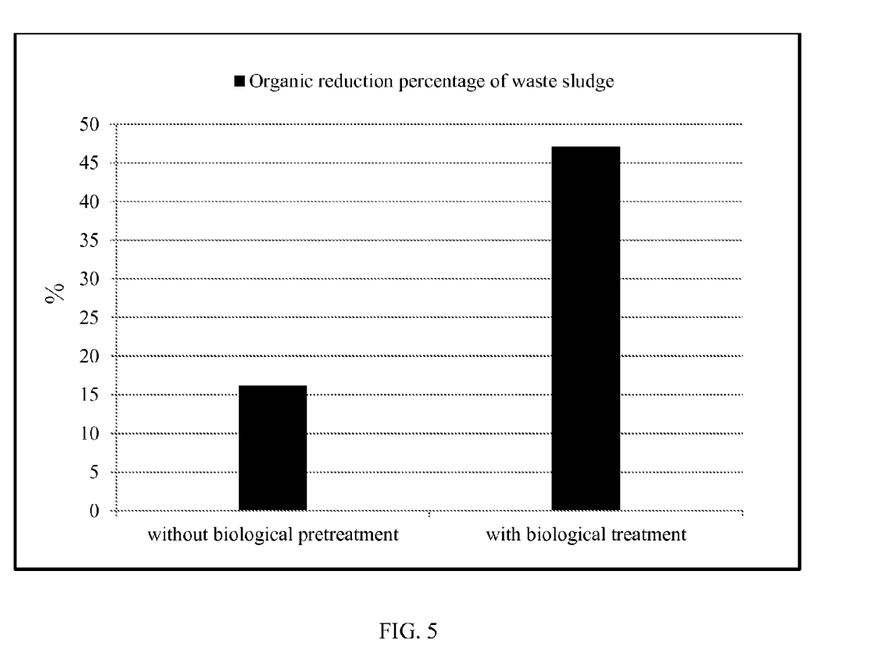
FIG. 5 is a graph showing reduction percentage of the waste sludge organics after algal treatment for Example 6 herein.

The remaining organic concentration of waste sludge after algal treatment was measured and the organic reduction percentage of waste sludge after biological and algal treatment is presented in FIG. 5. The results in this example demonstrate that biological pretreatment can effectively enhance the waste sludge reduction by algae.

Example 7

In one example, the effect of utilizing both biological pretreatment and pretreatment with a base was investigated. Five systems were prepared.

In System A, waste sludge was kept in a still closed system for 72 hours to perform anaerobic digestion. Then, the waste sludge was stirred for 6 hours. After stirring, the waste sludge was diluted by 30 times with deionized water. After the pH adjusted to 5, the system was inoculated with 0.5 g/L algae. Then, the system was stirred with the pH controlled in the range from 3.5 to 6.5.

In System B, the pH of waste sludge was adjusted to 8 and controlled at that pH for 20 minutes. Then the waste sludge was kept in a still closed system for 72 hours to perform anaerobic digestion. After anaerobic digestion, the waste sludge was stirred for 6 hours. After stirring, the waste sludge was diluted by 30 times with deionized water. After the pH adjusted to 5, the system was inoculated with 0.5 g/L algae. Then the system was stirred with the pH controlled in the range from 3.5 to 6.5.

In System C, the pH of waste sludge was adjusted to 9 and controlled at that pH for 20 minutes. Then, the waste sludge was kept in a still closed system for 72 hours to perform anaerobic digestion. After anaerobic digestion, the waste sludge was stirred for 6 hours. After stirring, the waste sludge was diluted by 30 times with deionized water. After the pH adjusted to 5, the system was inoculated with 0.5 g/L algae. Then, the system was stirred with the pH controlled in the range from 3.5 to 6.5.

In System D, the pH of waste sludge was adjusted to 10 and controlled at that pH for 20 minutes. Then, the waste sludge was kept in a still closed system for 72 hours to perform anaerobic digestion. After anaerobic digestion, the waste sludge was stirred for 6 hours. After stirring, the waste sludge was diluted by 30 times with deionized water. After the pH adjusted to 5, the system was inoculated with 0.5 g/L algae. Then, the system was stirred with the pH controlled in the range from 3.5 to 6.5.

In System E, the pH of waste sludge was adjusted to 11 and controlled at that pH for 20 minutes. Then, the waste sludge was kept in a still closed system for 72 hours to perform anaerobic digestion. After anaerobic digestion, the waste sludge was stirred for 6 hours. After stirring, the waste sludge was diluted by 30 times with deionized water. After the pH adjusted to 5, the system was inoculated with 0.5 g/L algae. Then, the system was stirred with the pH controlled in the range from 3.5 to 6.5.

Figure 6:
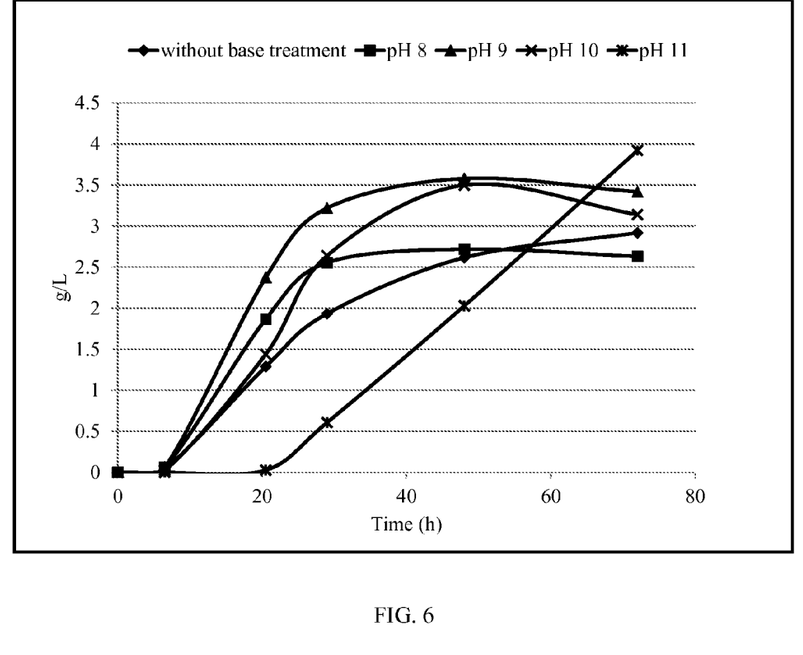
FIG. 6 is a graph showing concentration changes of volatile fatty acid during the anaerobic digestion process for Example 7 herein.
Figure 7:
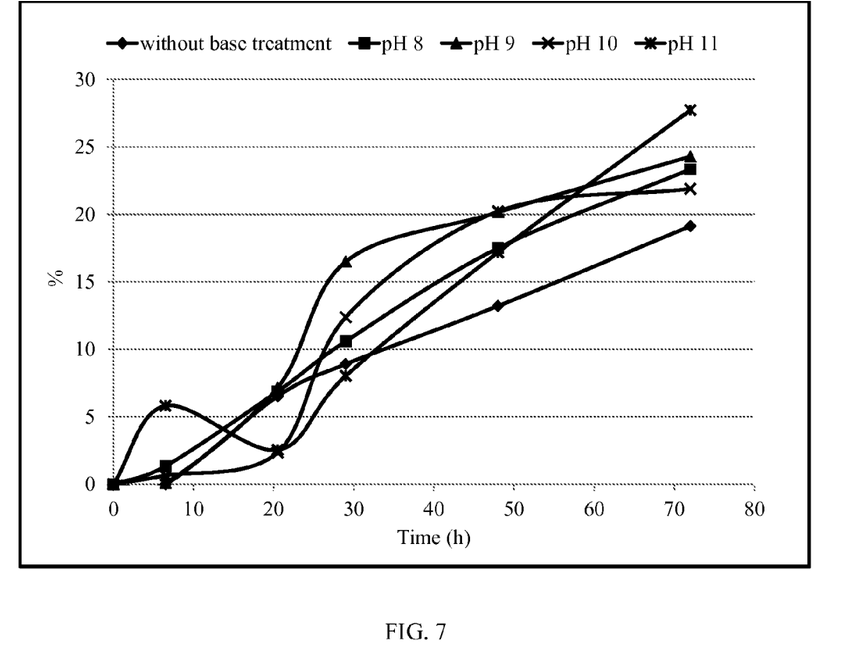
FIG. 7 is a graph showing the change of organic reduction percentage during the anaerobic digestion process for Example 7 herein.
Figure 8:
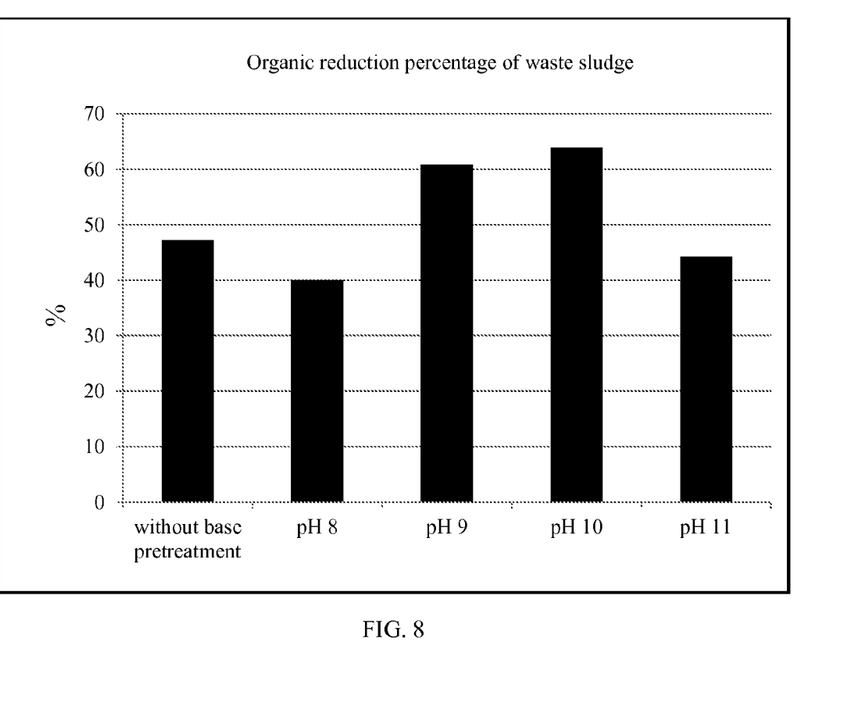
FIG. 8 is a graph showing reduction percentage of the waste sludge organics after algal treatment for Example 7 herein.

FIG. 6 shows the change of volatile fatty acid concentration with time for these systems. In general, the systems with initial base treatment produced more volatile fatty acid than the system without initial base treatment. With higher initial pH, more volatile fatty acid was produced. FIG. 7 shows the organic reduction percentage of waste sludge during the anaerobic digestion process for these systems. The systems with initial base treatment had higher organic reduction percentages during the anaerobic digestion than the system without initial base treatment. Additionally, the remaining organic concentration of the waste sludge after algal treatment was measured. The organic reduction percentage of the waste sludge after algal treatment is presented in FIG. 8. These results demonstrate that the combination of biological pretreatment and base pretreatment can enhance the waste sludge reduction by algae.

In light of the foregoing, it should be appreciated that the present invention significantly advances the art by providing an improved method and system of treating solid organic materials. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method for treating solid organic material comprising the steps of pretreating solid organic material, wherein said pretreating step is selected to achieve a particular purpose based on the solid organic material and phagotrophic algae combined in a subsequent step of combining, wherein said pretreating step does not utilize a microorganism-containing vessel, combining phagotrophic algae and the pretreated solid organic material, allowing the phagotrophic algae to grow by ingesting the pretreated solid organic material, forming an algal product, and collecting the algal product.

2. The method of claim 1, wherein the solid organic material is selected from the group consisting of a food manufacturing byproduct, an agricultural byproduct, and waste activated sludge.

3. The method of claim 2, wherein the phagotrophic algae is selected from the group consisting of chrysomonad genera including *Dinobryon, Chrysochromulina, Chrysosphaerella, Uroglena, Catenochrysis, Ochromonas, Chromulina*, and *Chrysococcus*; the coccolithophorid *Coccolithus pelagicus*; the xanthophyte *Chlorochromonas*, the chrysophytes *Phaeaster, Chrysamoeba*, and *Pedinella*; the photosynthetic dinoflagellate *Ceratium hirundinella Muller*; and *Cryptomonas ovata* Ehrenberg.

4. The method of claim 2, wherein the solid organic material is waste activated sludge, the method further comprising a step of forming an algal byproduct, wherein the algal byproduct includes the treated waste activated sludge, wherein said step of allowing the phagotrophic algae to grow by ingesting the waste activated sludge causes the pathogen level in the algal byproduct to be at a level below detectable limits, and wherein the algal byproduct meets one of the following requirements:

the density of fecal coliform in the algal byproduct is less than 1,000 most probable numbers (MPN) per gram total solids on a dry-weight basis; or the density of *Salmonella* sp. bacteria in the algal byproduct is less than 3 MPN per 4 grams of total solids on a dry-weight basis.

5. The method of claim 1, wherein said step of pretreating includes treating the solid organic material with a base at a pH of greater than 9 for 6 hours or more, wherein the particular purpose includes one or more of increasing the concentration of soluble nutrients, producing more volatile fatty acid, and hydrolysing oligomeric and polymeric compounds in the solid organic material into smaller compounds.

6. The method of claim 1, wherein said step of pretreating includes subjecting the solid organic material to sound energy such that a sonication step is performed, wherein the particular purpose includes breaking down and releasing the solid organic materials into smaller particles thereby improving direct ingestion during said step of allowing the phagotrophic algae to grow.

7. The method of claim 1, wherein said pretreating step includes dissociating at least a portion of the solid organic material, wherein the particular purpose includes breaking down and releasing the solid organic materials into smaller particles thereby improving direct ingestion during said step of allowing the phagotrophic algae to grow.

8. The method of claim 1, wherein said step of combining the phagotrophic algae and the solid organic material includes exposure to air.

9. The method of claim 1, wherein said pretreating step includes a physical method selected from the group consisting of crushing, milling, heating, steaming, ultra-sonication, and homogenizing, wherein the particular purpose includes breaking down and releasing the solid organic materials into smaller particles thereby improving direct ingestion during said step of allowing the phagotrophic algae to grow.

10. The method of claim 1, wherein said pretreating step includes a chemical method selected from the group consisting of acidification, basification, ozonization, and bleaching.

11. The method of claim 1, wherein said pretreating step includes a synergistic combination of a sonication step and an alkaline treatment, wherein the particular purpose includes improved sludge disintegration.

12. The method of claim 11, wherein said alkaline treatment includes adjusting the pH of the solid organic materials to a range of 9 or more to 11 or less, said alkaline treatment occurring prior to said sonication step.

13. A method for treating solid organic materials comprising the steps of providing waste activated sludge at a pH of above 7, pretreating the waste activated sludge, wherein said pretreating step is selected to achieve a particular purpose based on the waste activated sludge and phagotrophic algae combined in a subsequent step of combining, wherein said pretreating step does not utilize a microorganism-containing vessel, adjusting the pH of the waste activated sludge to a pH of below 7, combining phagotrophic algae with the pretreated waste activated sludge, allowing the phagotrophic algae to grow by ingesting the waste activated sludge, forming an algal product, and collecting the algal product.

14. The method of claim 13, wherein said step of pretreating includes maintaining the pH of the waste activated sludge above 7 for a time period of 20 minutes or more, wherein the particular purpose includes one or more of increasing the concentration of soluble nutrients, producing more volatile fatty acid, and hydrolysing oligomeric and polymeric compounds in the solid organic material into smaller compounds.

15. The method of claim 13, wherein said step of pretreating includes subjecting the waste activated sludge to sound energy such that a sonication step is performed, wherein the particular purpose includes breaking down and releasing the solid organic materials into smaller particles thereby improving direct ingestion during said step of allowing the phagotrophic algae to grow.

16. The method of claim 13, wherein the phagotrophic algae is selected from the group consisting of chrysomonad genera including *Dinobryon; Chrysochromulina; Chrysosphaerella; Uroglena; Catenochrysis; Ochromonas* selected from the group consisting of *Ochromonas danica, Ochromonas malhamensis, Ochromonas tuberculata*, and *Ochromonas vallescia; Chromulina*; and *Chrysococcus*; the coccolithophorid *Coccolithus pelagicus*; the xanthophyte *Chlorochromonas*, the chrysophytes *Phaeaster, Chrysamoeba*, and *Pedinella*; the photosynthetic dinoflagellate *Ceratium hirundinella* Muller; and *Cryptomonas ovata* Ehrenberg.

\* \* \* \* \*